Feb. 8, 1944.  W. J. FRITSCH  2,340,952
ANTIBUZZ REGULATOR
Filed Oct. 17, 1941

INVENTOR
WILLIAM J. FRITSCH
BY
ATTORNEY

Patented Feb. 8, 1944

2,340,952

UNITED STATES PATENT OFFICE 2,340,952

ANTIBUZZ REGULATOR

William J. Fritsch, Marshalltown, Iowa, assignor to Phillips Petroleum Company, a corporation of Delaware Application October 17, 1941, Serial No. 415,469

2 Claims. (Cl. 50—21)

This invention relates to an improvement for fluid pressure regulators such as shown and described in the T. A. St. Clair application, Serial No. 281,967, filed June 29, 1939, now Patent No. 2,271,278, granted January 27, 1942, which is similar to the regulator described and claimed in the Lewis Patent No. 2,245,485 of June 10, 1941.

Pressure regulators of this type are adapted to be employed in systems for dispensing liquefied petroleum gases for example as shown in the R. W. Thomas application, Serial No. 281,969, filed June 29, 1939. In systems for dispensing liquefied petroleum gases, two storage tanks are ordinarily employed, each of which is provided with a pressure regulator for reducing the tank pressure to a fairly constant value. A second stage regulator is usually utilized in these systems whereby the pressure is further reduced to slightly above atmospheric before passing to the service line leading to the gas consuming appliances. When the storage tanks containing liquefied petroleum gas are connected in the system, one of said tanks will constitute the supply source to the service line while the other tank is held in reserve. When the tank which is under supply approaches exhaustion, the pressure to the service line will decrease until it reaches a point below the setting of the regulator on the reserve tank at which time the regulator diaphragm will be depressed and gas flow will then take place from the reserve tank to the line. The regulator which is the subject matter of the St. Clair application automatically shuts off the flow of gas in the reverse direction when the tank is disconnected. In this arrangement, the diaphragm seats on the outlet orifice, which is formed into a valve seat, on pressure drop below the diaphragm.

Fluid pressure regulators of the above mentioned type include a diaphragm which is responsive to line pressure and are connected with the high pressure storage tank by a conduit. The tank outlet is provided with a core valve which is actuated by a push pin, when the regulator is connected, extending through the conduit from the diaphragm to the valve. The push pin is of considerably smaller diameter than the conduit to provide a passage for the flow of gas from the tank and is spaced from the conduit by guides.

In the operation of the regulators, where the inclusion of the control valve in the tank necessitates the use of a push pin, experience has shown that a pronounced buzzing tendency exists in the connection between the fluid pressure storage tank and the bottom of the diaphragm. This difficulty which has proven quite objectionable in the operation of these systems is due to vibration of the push pin relative to the inside of the conduit and lengthwise between the diaphragm and the core valve. The apparatus for dispensing liquefied petroleum gases is ordinarily located in the immediate vicinity of the building and therefore quiteness is very essential in the operation of such systems. Sounds incident to the operation of the regulator are carried to the interior of the building through the medium of the installation piping. The consumption of the gaseous fuel is not constant and sudden changes in pressure in the line and regulator causes fluctuation of the diaphragm resulting in rapid vibration and buzzing of the push pin against the inside of the conduit connecting the storage tank to the diaphragm chamber.

An object of this invention is to provide a means for regulating fluid flow from a high pressure fluid storage tank to the diaphragm of a pressure regulator which will be quiet and efficient in operation. A further object of this invention is the provision of a resilient accessory on the diaphragm push pin of a pressure regulator which eliminates vibration relative to the inside of the connecting conduit and results in smooth operation. Another object is the construction of a push pin assembly which employs loading means suitably arranged and adjusted as to allow satisfactory operation of the push pin and at the same time eliminate relative vibration thereof.

Figure 1:
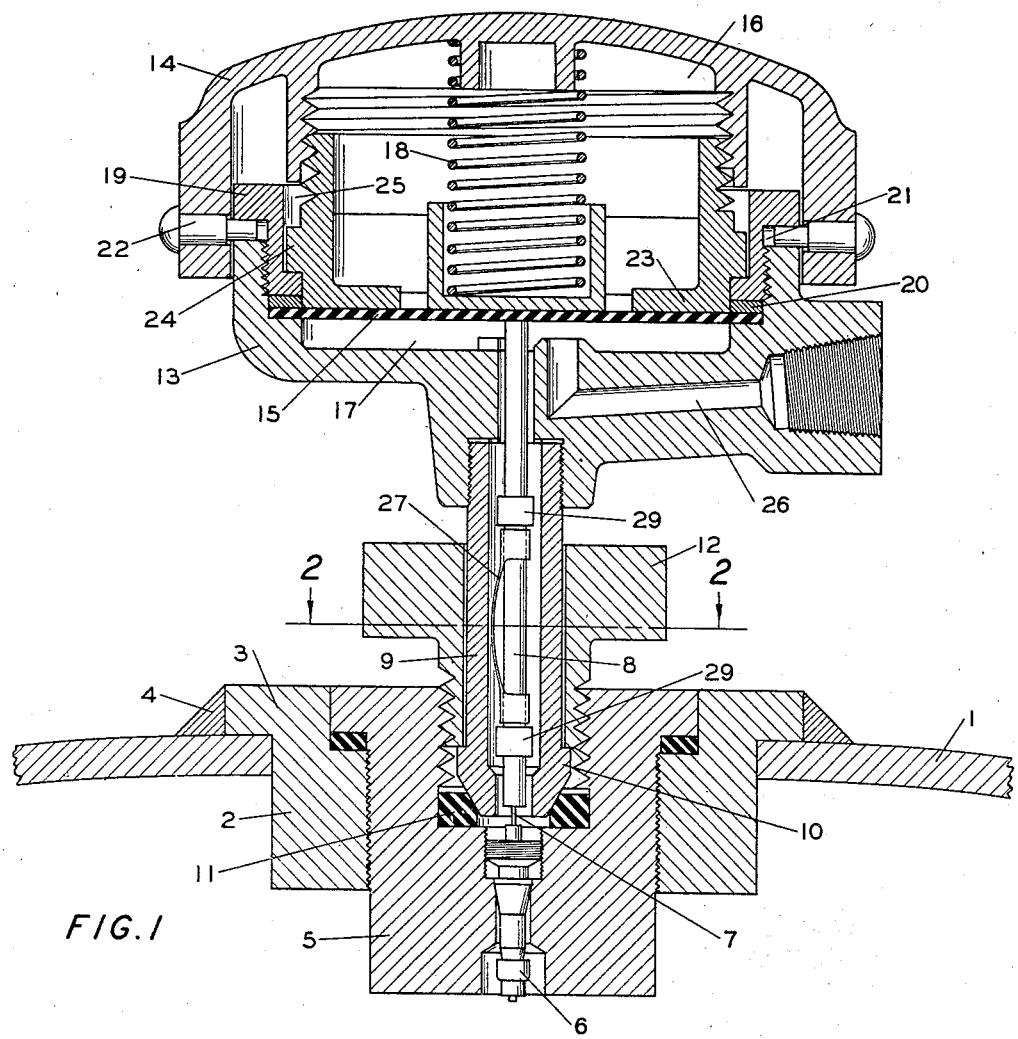
Figure 1 is a vertical sectional view of one type of pressure regulator incorporating the present invention.

Referring to the drawing a fluid pressure regulator of the type disclosed in the St. Clair application is shown. A portion of a liquefied or high pressure gas container is designated at 1 provided with an annular ring 2 having an integral shoulder 3 which is welded or otherwise secured to the high pressure container at 4. The ring 2 is tapped to receive a plug member 5 which is drilled and tapped for the insertion of a tire core valve 6. The valve 6 has a stem 7 which is engaged by a force transmitting element or a push pin 8 movable within a tubular conduit 9 and provided with upper and lower guides 29. The tubular conduit has an enlargement 10 on its lower end which engages a resilient sealing ring 11 and a threaded recess in the plug 5. The end of the conduit is forced into sealing engagement with the ring 11 by a clamping nut 12 as shown in the drawing.

A regulator housing comprising a body 13 and a cover 14 has a flexible diaphragm 15 which divides the housing into two compartments, namely, a loading compartment 16 and a fluid compartment 17 below the diaphragm. The loading compartment 16 is vented to the atmosphere and contains an expansion spring 18 adjustably disposed between the cover 14 and the top of the diaphragm. A diaphragm retainer 19 with a threaded connection to the body 13 bears upon a diaphragm slip ring 20 which in turn clamps diaphragm 15 securely in place. The retainer 19 is screwed into engagement with the body 13 providing a circumferential groove 21 for the reception of guide bolts 22 projecting inwardly in the cover 14 and allowing rotation of the cover relative to the regulator body. The loading compartment 16 has a diaphragm stop 23 for limiting the movement of the diaphragm. The diaphragm stop is in threaded engagement with the interior of the cover 14 and is provided with lugs 24 which move vertically in slots 25 formed in the diaphragm container 19 and preventing the diaphragm stop from rotation relative to the regulator body 13. The regulator is adjusted by rotation of the cover 14 which, by virtue of the diaphragm stop, limits the diaphragm movement and controls the outlet pressure of the regulator as fully described and shown in the aforementioned St. Clair application. An outlet passage 26 connects the regulator with the service line leading to the gas consuming appliances. A resilient spring 27 is secured to the push pin 8 in any suitable manner.

Figures 2, 3:
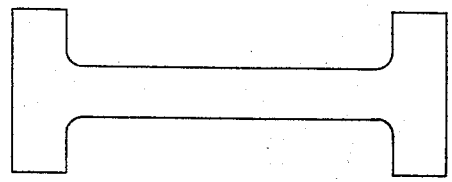
Figure 2 is a horizontal section on the line 2—2 of Figure 1.
Figure 3 shows a stamped metal blank prior to formation into the bowed spring device shown in Figure 1.

This device may be stamped from a sheet of resilient metal in the form of an I as shown in Figure 3. The extreme ends of the spring are bent circumferentially to conform to the shape of the push pin and the middle section is compressed or bulged outwardly to the proper loading. The device thus constructed may then be snapped on to the push pin between the upper and lower guides 29. The bulged or semi-elliptical portion of the spring engages the interior of the conduit 9 as best shown in Figure 2. The loading of the spring is quite critical inasmuch as the frictional engagement between the push pin and the conduit must be sufficient to eliminate relative vibration, but not so great that the core valve will fail to close when the diaphragm moves upwardly.

It is obvious that other resilient loading means might be employed in place of the specific device disclosed without departing from the spirit of this invention.

I claim:

1. A device for the elimination of buzz in a pressure regulator comprising in combination a regulator casing, a pressure actuated diaphragm in said casing forming a compartment between the diaphragm and one side of the casing, a conduit for conducting fluid under relatively high pressure to one side of said diaphragm secured to said one side of said casing, a valve in the conduit remote from and having a stem projecting toward said diaphragm, an elongated force transmitting element mounted for lengthwise movement in said conduit and having its ends separate from and in engagement with said diaphragm and said valve stem, respectively, said force transmitting element being responsive to movement of said diaphragm and so constructed and arranged as to provide a passage for fluid flow through said conduit to said diaphragm, and resilient means secured to said force transmitting element between its ends and bearing against the wall of said conduit for imparting frictional resistance to lengthwise movement of said force transmitting element to prevent vibration of said element in said conduit and consequent buzz caused by such vibration.

2. A device for the elimination of buzz in a pressure regulator comprising in combination a regulator casing, a pressure actuated diaphragm in said casing forming a compartment between the diaphragm and one side of the casing, a conduit for conducting fluid under relatively high pressure to one side of said diaphragm secured to said one side of said casing, a valve in the conduit remote from and having a stem projecting toward said diaphragm, an elongated force transmitting element mounted for lengthwise movement in said conduit and having its ends separate from and in engagement with said diaphragm and said valve stem, respectively, said force transmitting element being responsive to movement of said diaphragm and so constructed and arranged as to provide a passage for fluid flow through said conduit to said diaphragm, and semi-elliptical spring means secured to said force transmitting element between its ends and bearing against the wall of said conduit for imparting frictional resistance to lengthwise movement of said force transmitting element to prevent vibration of said element in said conduit and consequent buzz caused by such vibration.

WILLIAM J. FRITSCH.